(12) United States Patent
Sandstrom

(10) Patent No.: US 6,959,743 B2
(45) Date of Patent: Nov. 1, 2005

(54) TIRE WITH SILICA-RICH TREAD CAP LAYER AND CARBON BLACK-RICH SUPPORTING TRANSITION ZONE OF INTERMEDIATE AND BASE LAYERS

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 376 days.

(21) Appl. No.: 10/242,963

(22) Filed: Sep. 13, 2002

(65) Prior Publication Data

US 2004/0050469 A1 Mar. 18, 2004

(51) Int. Cl.[7] ............................. B60C 1/00; B60C 11/00
(52) U.S. Cl. ................................ 152/209.5; 152/209.18
(58) Field of Search .......................... 152/209.5, 209.18

(56) References Cited

U.S. PATENT DOCUMENTS

| | | | | |
|---|---|---|---|---|
| 4,319,619 A | | 3/1982 | Kozima et al. ............. | 152/209 |
| 5,082,901 A | * | 1/1992 | Linster ....................... | 525/237 |
| 5,679,728 A | | 10/1997 | Kawazura et al. ......... | 523/215 |
| 5,718,782 A | | 2/1998 | Fourgon ..................... | 152/209 |
| 5,772,807 A | | 6/1998 | Fourgon ..................... | 152/209 |
| 5,843,249 A | | 12/1998 | Ryba .......................... | 152/209 |
| 6,028,137 A | | 2/2000 | Mahmud et al. ........... | 524/496 |
| 6,121,367 A | * | 9/2000 | Corvasce et al. .......... | 524/492 |
| 6,429,245 B1 | * | 8/2002 | Francik et al. ............. | 524/262 |

FOREIGN PATENT DOCUMENTS

| | | | | |
|---|---|---|---|---|
| DE | 19731525 | | 7/1998 | ........... B60C/11/00 |
| EP | 538723 | | 4/1993 | ............. B60C/1/00 |
| EP | 576130 | | 12/1993 | ........... B60C/11/00 |
| EP | 594045 | | 4/1994 | ........... B60C/11/00 |
| EP | 738613 | * | 10/1996 | |
| JP | 59-59504 | * | 4/1984 | |
| JP | 2-70503 | * | 3/1990 | |
| JP | 6-157829 | * | 6/1994 | |
| JP | 9-328579 | * | 12/1997 | |
| JP | 11-60810 | * | 3/1999 | |

OTHER PUBLICATIONS

Abstract for Europe 594045.*
Abstract for German 19731525.*
European Search Report.

* cited by examiner

Primary Examiner—Steven D. Maki
(74) Attorney, Agent, or Firm—Henry C. Young, Jr.

(57) ABSTRACT

The invention relates to a tire having a rubber tread of a cap/base configuration composed of a composite of a silica-rich tread cap layer running surface, and an underlying transition zone composite of a carbon black-rich intermediate layer positioned between the tread cap layer and a tread base layer. The combination of intermediate layer and base layer provide a beneficial graduated stiffness between the tread cap layer and the tire carcass. Significantly, the transition zone composite enables a significantly thicker carbon-black rich portion of the tread composite and an associated thinner silica-rich tread cap running surface. In one aspect, the intermediate layer of the transition zone composite can extend to and include a bottom portion of at least two of the grooves of said tread cap layer to support an associated tread lug therebetween.

12 Claims, 2 Drawing Sheets

Figure 1:
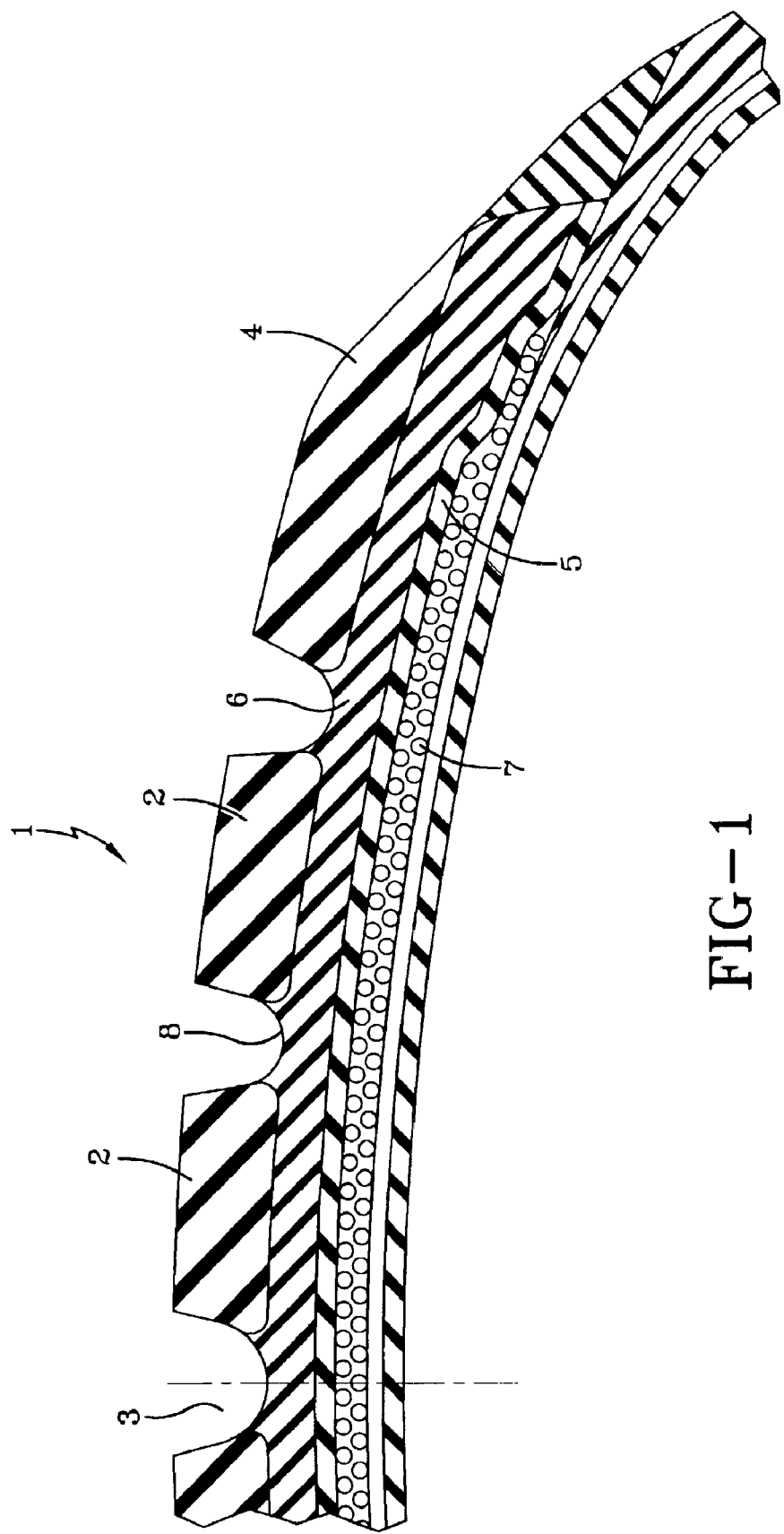

TIRE WITH SILICA-RICH TREAD CAP LAYER AND CARBON BLACK-RICH SUPPORTING TRANSITION ZONE OF INTERMEDIATE AND BASE LAYERS

FIELD OF THE INVENTION

The invention relates to a tire having a rubber tread of a cap/base configuration composed of a composite of a silica-rich tread cap layer running surface, and an underlying transition zone composite of a carbon black-rich intermediate layer positioned between the tread cap layer and a tread base layer. The combination of intermediate layer and base layer provide a beneficial graduated stiffness between the tread cap layer and the tire carcass. Significantly, the transition zone composite enables a significantly thicker carbon-black rich portion of the tread composite and an associated thinner silica-rich tread cap running surface. In one aspect, the intermediate layer of the transition zone composite can extend to and include a bottom portion of at least two of the grooves of said tread cap layer to support an associated tread lug therebetween.

BACKGROUND FOR THE INVENTION

Passenger tires often contain a rubber tread of a cap/base construction. The tread cap provides the running surface of the tread and the underlying tread base layer presents a transition zone between the tread cap and tire carcass.

Historically, the tread cap may be a silica-rich rubber composition and the tread base layer may be a carbon black-rich rubber composition.

Conventionally, for a passenger tire, the tread base is typically a relatively thin rubber layer and the tread cap is typically a relatively thick, major portion of such cap/base construction.

However, silica reinforcement is of a significantly greater cost than carbon black reinforcement thereby providing an incentive for creating a novel tire tread construction of reduced thickness for a silica-rich tread cap layer where silica is the major reinforcing filler.

Therefore, it is desired to provide a tread having a silica-rich tread cap layer of reduced thickness relative to the underlying tread base, particularly for use in a tire for a passenger vehicle.

Accordingly, for this invention, a tread is provided as a tread composite comprised of a relatively thin silica-rich tread cap layer and an underlying, integral, relatively thick transition zone composite. The transition zone composite is comprised of an intermediate carbon black-rich layer underlying said tread cap layer and a carbon black-rich tread base layer underlying the intermediate layer. In such construction, the intermediate layer is thereby positioned between said tread cap layer and tread base layer to enable a transition zone of graduated physical properties and, in turn, enable use of a thinner silica-rich tread cap layer.

For such purpose, the tread cap layer in combination with the intermediate layer and base layer of the transition zone composite are required to have a graduated stiffness property and allocated rubber compositions of glass transition temperature characteristics together with allocated silica and carbon black reinforcement for the various layers of the tread composite in which the transition zone composite plays an integral and significant part.

For such purpose, by adjusting the composition, physical property and thickness aspects of the layered tread composite, a carbon black-rich transition zone composite comprised of a cooperative combination of a base layer and intermediate layer in a manner that enables a reduced thickness of the silica-rich tread cap without significantly compromising the effectiveness of the tread cap running surface of the overall tread composite.

As a result, a tire tread is provided in which the transition zone composite is a significant portion of the thickness of the tread composite.

In the description of this invention, the terms "rubber" and "elastomer" where used herein, are used interchangeably, unless otherwise prescribed. The terms "rubber composition", "compounded rubber" and "rubber compound", where used herein, are used interchangeably to refer to "rubber which has been blended or mixed with various ingredients" and the term "compound" relates to a "rubber composition" unless otherwise indicated. Such terms are well known to those having skill in the rubber mixing or rubber compounding art.

In the description of this invention, the term "phr" refers to parts of a respective material per 100 parts by weight of rubber, or elastomer. The terms "cure" and "vulcanize" are used interchangeably unless otherwise indicated. The term "Tg" means the glass transition temperature of an elastomer determined by DSC (differential scanning calorimeter) at a heating rate of 10° C. per minute.

SUMMARY AND PRACTICE OF THE INVENTION

In accordance with this invention, a tire is provided having a rubber tread composite comprised of an outer tread cap layer and an integral underlying transition zone composite comprised of a tread base layer and an intermediate layer positioned between said tread cap layer and tread base layer, wherein:

(A) said outer tread cap layer has an outer running surface configured with lugs and grooves and is of a silica-rich rubber composition having a low shear (10 percent strain) G' modulus property (at 30° C. measured at 10 Hz) in a range of about 5 to about 50 MPa, comprised of, based upon parts by weight per 100 parts by weight rubber (phr)

(1) about 10 to about 90 phr of at least one first conjugated diene-based elastomer having a Tg in a range of from about −50° C. to about −110° C. and from about 90 to about 10 phr of at least one additional conjugated diene based elastomer having a Tg in a range of from about −10° C. to about −50° C. wherein the Tg's of said first and additional elastomers are spaced apart by at least 30° C., and (2) about 30 to about 150 phr of filler reinforcement selected from at least one of precipitated silica, carbon black and carbon black which contains silica domains on it surface, wherein said precipitated silica and said silica domains contain hydroxyl groups on their surfaces, wherein said filler reinforcement is comprised of at least 51, and preferably at least 85, weight percent of said silica and/or carbon black which contains silica domains on its surface, as the case may be, (B) said intermediate layer of said transition zone composite extends to and includes a visible bottom portion of at least two of said grooves in said cap layer, wherein said grooves extend completely through the said cap layer, to thereby support an associated tread lug therebetween, wherein said intermediate layer is a carbon black-rich rubber composition having a low shear (10 percent strain) G' modulus property (at 30° C. measured at 10 Hertz) in a range of about 3 to about 25 MPa, and wherein said low shear modulus property of said intermediate layer is at least ten percent less than the low shear modulus property of said outer tread cap layer, comprised of, based upon parts by weight per 100 parts by weight rubber (phr)

(1) about 30 to 100 phr of at least one first conjugated diene-based elastomer having a Tg of lower than −50° C., preferably in a range of about −50° C. to about −110° C., and, correspondingly, about 70 to zero phr of at least one additional conjugated diene-based elastomer having a Tg in a range of about −10 to about −50° C., wherein the Tg's of said first and additional elastomers are spaced apart by at least 30° C., and (2) about 30 to about 120 phr of filler reinforcement selected from at least one of carbon black, precipitated silica and carbon black containing silica domains on its surface, wherein said silica and said silica domains contain hydroxyl groups on their surfaces, wherein said filler reinforcement is comprised of at least 51, and preferably at least 85, weight percent of said carbon black; and (C) said base layer of said transition zone composite is a carbon black-rich rubber composition having a low shear (10 percent strain) G' modulus property (at 30° C. measured at 10 Hertz) in a range of about 0.5 to about 10 MPa, and wherein said low shear modulus property of said base layer is at least ten percent less than said low shear modulus property of said intermediate layer, comprised of, based upon parts by weight per 100 parts by weight rubber (phr);

(1) about 70 to 100 phr of at least one first conjugated diene-based elastomer having a Tg of lower than −50° C., preferably in a range of about −50° C. to about −110° C., and about 30 to about zero phr of at least one additional conjugated diene-based elastomer having a Tg in a range of about −10 to about −50° C., wherein the Tg's of said first and additional elastomer are spaced apart by least 30° C., and (2) about 30 to about 100 phr of filler reinforcement selected from at least one of carbon black, precipitated silica and carbon black having domains of silica on its surface comprised of at least 51, and preferably at least 85, percent by weight of said carbon black, wherein said precipitated silica and silica domains on said carbon black contain hydroxyl groups (e.g. silanol groups) on their surfaces.

In practice, it is preferred that the ratio of maximum thickness of said tread cap layer to maximum thickness of said tread composite is in a range of from 2/1 to about 1/5.

In practice, it is preferred that the ratio of maximum thickness of said transition zone composite to maximum thickness of said tread composite is in a range of from about 1/2 to about 1/4.

In practice, it is preferred that the ratio of maximum thickness of said intermediate layer to maximum thickness of said base layer is in a range of from about 1/1 to about 5/1.

Significant aspects of the invention are graduated low shear physical properties from the tread cap layer to the base layer of the transition composite, graduated contents of the first diene-based elastomers of said layers and the balance of selection of reinforcement filler of the individual respective layers.

In particular, it is seen that the low shear modulus physical property graduates sequentially from ranges of from 5 to 50 MPa for the outer tread cap layer, from 3 to 25 MPa for the intermediate layer and from 0.5 to 10 MPa for the base layer, with the low shear physical property of each succeeding inner layer to be at least ten percent lower than said low shear physical property of the preceding outer layer.

For the purposes of this invention the, low shear modulus property is a viscoelastic property of a rubber composition determined by a Rheometrics Dynamic Spectrometer instrument provided by the Rheometrics company as RDS 7700 Series II referred to herein as an "RDS" instrument). The RDS instrument uses dynamic mechanical analysis to evaluate rubber compositions. A sinusoidally oscillating shear deformation is used as an operating mode. A sample of the respective rubber composition is subjected to a precisely controlled deformation (10 percent strain), frequency (10 Hertz) and temperature (30° C.) and the sample stress response is observed by the instrument. The observed sample response can be separated, by the instrument, into viscous (G") and elastic (G') components. For the purposes of this specification, the aforesaid testing conditions for the instrument were 10 percent strain, 10 Hertz and 30° C. to define the G' elastic low shear property in terms of MPa.

One having skill in the pertinent art would understand how to provide rubber compositions of various low shear properties (at 10 percent strain at 10 Hertz at 30° C.) pursuant to the requirements of the layered tread composite of this invention composed of the aforesaid elastomers and reinforcing fillers without undue experimentation.

Further, it is seen that associated ranges of the said first diene-based elastomer(s) of the respective layers graduates from a range of from 10 to 90 phr for the outer tread cap layer, from 30 to 100 phr for the intermediate layer and from 70 to 100 phr for the base layer.

In particular, it is seen that filler reinforcement graduates from a silica-rich rubber composition for the outer tread cap layer, namely from at least 51 to at least 85 weight percent precipitated silica and/or carbon black containing silica domains on its surface, to carbon-black rich rubber compositions of said intermediate layer and said base layer, namely from at least 51 to at least 85 weight percent carbon black.

Therefore, the outer cap layer may contain filler reinforcement as precipitated silica and/or carbon black having silica domains on its surface, preferably precipitated silica to the exclusion, or at least substantial exclusion of carbon black. Alternatively, the reinforcing filler for the tread cap layer may, for example, be at least 85 percent precipitated silica with the remainder being carbon black. Further, the intermediate layer and base layer may contain filler reinforcement as carbon black to the exclusion of both synthetic silica, particularly precipitated silica, and carbon black which contains domains of silica on its surface.

A significant aspect of this invention is the inclusion of the intermediate layer to significantly abridge the outer tread cap layer and inner, tread carcass-contacting, tread base layer in a differential manner, and particularly with a graduated low strain modulus property, particularly where the intermediate zone is relied upon to support one or more lugs of the tread cap layer.

This is considered herein to be significant because the associated graduated low strain modulus property of the intermediate layer of the transition zone composite provides the higher stiffness desired for the tread lug region, without relying entirely upon the tread base layer, wherein the tread base layer, in turn, provides the lower stiffness which is desired for the tread composite region adjacent to the tire carcass.

Another significant aspect of the invention is the differentiation between said tread cap, intermediate and base layers in terms of selective elastomer compositions. Such differentiation is evidenced by use of higher amounts of higher Tg elastomers for the tread cap running surface of the tread composite for promoting wet traction and handling and graduated lower Tg elastomers in the transition composite between the tread cap and tire carcass where it is considered not to require the high Tg elastomers for promotion of wet traction and therefore such elastomers can be selected of lower Tg values.

Thus, the layered transition zone beneath the tread cap layer is designed to both better match the higher stiffness property (higher low shear modulus) of the tread cap layer and to also provide a reduced low shear stiffness property adjacent to the tire carcass.

Another significant aspect of the invention is the inclusion of the bottom portion of at least one groove which extends through the thickness of the tread cap layer and into a portion of the intermediate layer. The intermediate layer thereby extends to and includes the bottom portion of at least two tread cap grooves and provides support for a bottom portion of an associated tread lug.

In such manner, the intermediate layer of the transition zone composite extends to and includes the bottom portion of at least two tread cap grooves to thereby provide support to a tread lug associated and between such tread grooves.

The aspect of providing a tread cap lug which abridges two associated tread cap grooves of which the bottom portion extends into said intermediate layer is considered herein to be significant because it maximizes the use of the intermediate zone of carbon black-rich compound to reduce cost without affecting ground contacting properties of rolling resistance, traction and treadwear.

Another significant aspect of the invention is the differentiation between said tread cap, intermediate and base layers in terms of graduated elastomer composition, namely the use of higher Tg elastomers in the tread cap running surface of the tread to promote wet traction and handling in general of the tire tread and lower Tg elastomers for the transition zone composite layers which are not intended to be ground-contacting and therefore do not have a purpose of promoting wet traction of the tread and can therefore be selected on a basis of reduced cost.

This is considered herein to be significant because normally lower cost elastomers having lower Tg's may be used for the intermediate zone, thereby enabling a thicker layered underlying transition zone composite, with a resulting thinner tread cap layer for a similar or same overall thread thickness, without a significant, if any, penalty for tire performance (e.g. skid resistance, etc).

A further significant aspect of the invention is the graduated reinforcing filler selection, namely the use of a silica-rich, although carbon black-containing, rubber composition for the tread cap layer running surface and the use of carbon black-rich rubber compositions for the intermediate and base layered transition zone composite.

This is considered herein to be significant because material costs can be reduced by use of the lower cost carbon black reinforcing filler for a more significant portion of the overall tread construction as well a reduced processing cost for the layered tread construction since the processing of the carbon black-rich rubber compositions for the transition zone layers are normally less intensive and thereby of less cost than the processing of the silica-rich rubber composition of the tread cap layer.

Further, a significant aspect of the invention is the preferred relative maximum thickness of each of the said layers of the tread construction or composite. This includes the silica-rich tread cap layer, carbon black-rich intermediate layer and carbon black-rich base layer in relation to the maximum thickness of the overall tread.

This is considered herein to be significant because of the aforesaid expected reduced material cost of the overall tread composite which may result from the enabled choice of reinforcing fillers and cost of selection of elastomers required to provide the low strain modulus property in each layer of the composite.

In practice, the above significant aspects of the invention are to be considered in a synergistic combination rather than treated as individual aspects and components of the invention. The tire tread particularly should not be considered as a simple tread composite of a relatively thick base and thin cap but of a combination of a sequence of significant required compound layers of defined elastomer composition and particulate reinforcement, and low strain modulus properties, within the required transition zone of intermediate and base layer construction.

Therefore, it is to be appreciated that the required tread composite is a combination of structure and composition aspects which are combined with low strain modulus requirements.

For the purposes of this invention, the precipitated silica and/or carbon black which contains domains of silica on its surface, is normally used in combination with a coupling agent having a moiety reactive with hydroxyl groups contained on the surface of the silica (e.g. silanol groups) and another moiety interactive with said diene-based elastomers. For example, such coupling agent may be a bis(3-trialkoxysilylalkyl)polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or an average of from 3.5 to 4, connecting sulfur atoms in its polysulfidic bridge, preferably an average of from 2 to 2.6 connecting sulfur atoms.

Representative of such coupling agent are, for example, bis(3-triethoxysilylpropyl)polysulfide having an average of from 2 to 2.6 or an average of from 3.5 to 4, connecting sulfur atoms in its polysulfidic bridge, preferably an average of from 2 to 2.6 connecting sulfur atoms. In one aspect of the invention, it may be desired that such coupling agent is exclusive of bis(3-trialkoxysilylalkyl)polysulfides (e.g. bis (3-triethoxysilylpropyl)polysulfide) having an average of greater than 2.6 connecting sulfur atoms in its polysulfidic bridge so that in practice only a minimal amount of free sulfur atoms are initially generated by a break-up of the polysulfidic chain of sulfur atoms of the organosilane polysulfide at least during the initial mixing of the silica and organosilane polysulfide so that a reaction between the alkoxysilane and hydroxyl groups of the silica, or silica domains on the silica-containing carbon black is favored as compared to an interaction of free sulfur and elastomers during the mixing of the rubber composition prior to addition of free sulfur an a finishing (productive) mixing stage of the rubber composition.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica containing carbon black relates to carbon black which contains domains of exposed silica on the surface of the carbon black. For the purposes of this invention, the domains of silica contain hydroxyl groups (e.g. silanol groups) Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

Representative examples of other silica coupling agents may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

For the intermediate layer and base layer of the tread construction, rubber reinforcing carbon blacks are used preferably to the exclusion of synthetic silica such as for example precipitated silica. Representative rubber reinforcing blacks may be referred to by their ASTM designations such as for example for tread rubber compositions, although not intended to be limitive, N110, N121 and N234. Other rubber reinforcing carbon blacks may found, for example, in *The Vanderbilt Rubber Handbook* (1978), Page 417.

Representative elastomers for said first elastomer(s) of said tread cap layer, intermediate layer and base layer are, for example, styrene-butadiene copolymers prepared by organic solvent solution polymerization or by aqueous emulsion polymerization, isoprene/butadiene copolymers, styrene/isoprene/butadiene terpolymers and tin coupled organic solution polymerization prepared styrene/butadiene copolymers, cis 1,4-polyisoprene and cis 1,4-polybutadiene.

Representative elastomers for said additional elastomer(s) of said tread cap layer, intermediate layer and base layer are, for example, styrene-butadiene copolymers prepared by organic solvent solution polymerization or by aqueous emulsion polymerization, isoprene/butadiene copolymers, styrene/isoprenelbutadiene terpolymers, tin coupled organic solution polymerization prepared styrene/butadiene copolymers, 3,4-polyisoprene and high vinyl polybutadiene rubber.

One having skill in the pertinent art would understand how to select and utilize representative elastomers from said exemplified first and additional elastomers for said cap layer, intermediate layer and base layer in order to provide elastomers of the required Tg's for each of such layers. For example, a layer may contain a styrene/butadiene copolymer elastomer of one Tg for at least one of its first elastomers and another styrene/butadiene copolymer of another Tg for at least one of its additional elastomers.

Figure 2:
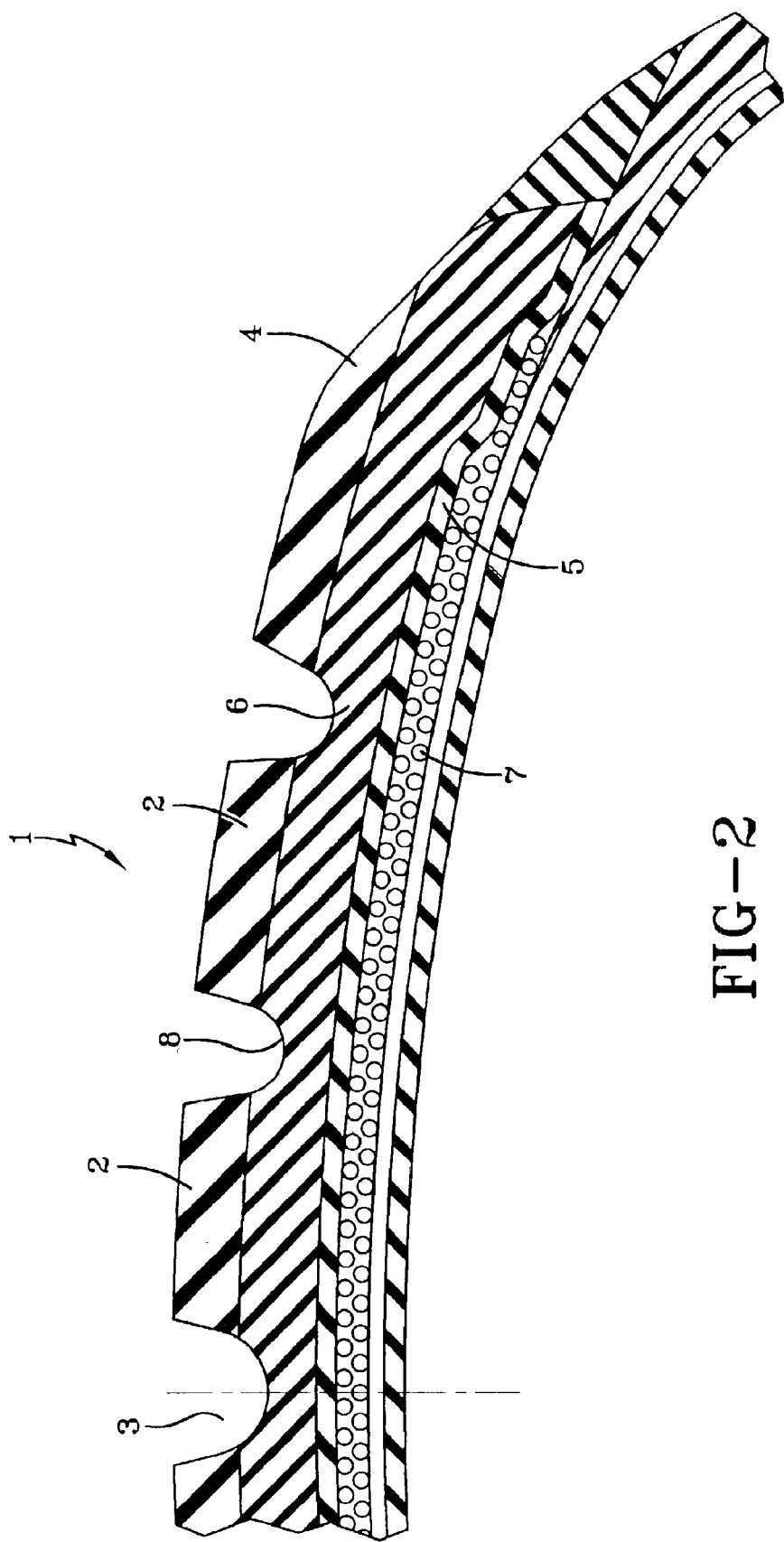

For a further understanding of this invention, FIG. 1 (FIG. 1) and FIG. 2 (FIG. 2) are provided as partial cross-sectional views of a tire tread In particular, FIG. 1 depicts a tread construction of a tread (1) a lug (2) and groove (3) construction which is comprised of a silica-rich tread cap layer (4) intended to be ground-contacting, a carbon black-rich tread base layer (5) and an intermediate carbon black-rich layer (6) positioned between and integral with said tread cap layer (4) and tread base layer (5). It is considered herein that said intermediate tread layer (6) and base tread layer (5) constitute a transition zone between said tread cap layer (4) and the tire carcass (7) by presenting the associated graduated low shear modulus properties and compositional contents of this invention.

Form FIG. 1 it can also be seen that a bottom portion (8) at the grooves (3) extends through said tread cap layer (4) into said intermediate layer (6) or, in other words, a portion of said intermediate layer (6) encompasses the bottom portion (8) of at least two of said grooves (3) of said tread cap layer (4) which extends completely through said tread cap layer (4).

In particular, it is seen that the intermediate layer (6) includes the bottom portion of at least two of the grooves (3) in a manner to support the associated lug (2) therebetween.

In practice, the tread cap layer (4), intermediate tread layer (6) and base tread layer (5) are of graduated low shear modulus properties extending between tread cap layer (4), ant the tire carcass.

In FIG. 1, the tread is presented as, for illustrated purposes, somewhat approximating:

(A) a thickness of said tread cap layer (4) and thickness of the portion of the tread (1) which includes said tread cap layer (4), said intermediate layer (6) and said base layer (5), of a ratio of about 2/1, although the actual dimensions of the elements, or layers of FIG. 1 itself are only presented as a demonstration and may vary somewhat, and (B) a thickness of said intermediate layer (6) and thickness of the portion of the tread (1) which includes said intermediate layer as well as all of said tread cap layer (4) and the tread base layer (5), of a ratio of about 5/1, although the actual dimensions of the elements, or layers of FIG. 1 itself are only presented as a demonstration and may vary somewhat.

FIG. 2 is a duplicate of FIG. 1 except that the intermediate layer (6) extends from the bottom portion of at least two of grooves (3) up to about 50 percent of the height of the grove wall of the associated lug (2) to support the associate lug (2) therebetween. Therefore, the associated thickness of the intermediate layer (6) is greater than the thickness of the intermediate layer (6) of FIG. 1. This aspect of extension of the intermediate layer (6) in the groove (3) to be more inclusive of the wall of the associated grooves (3) is intended to depict the lug (2) being more completely supported by the intermediate layer (6) of the transition tread base zone.

In practice, the rubber compositions may be prepared in at least one preparatory (non-productive) mixing step in an internal rubber mixer, often a sequential series of at least two separate and individual preparatory internal rubber mixing steps, or stages, in which the diene-based elastomer is first mixed with the prescribed silica and/or carbon black as the case may be followed by a final mixing step (productive mixing step) in an internal rubber mixer where curatives (sulfur and sulfur vulcanization accelerators) are blended at a lower temperature and for a substantially shorter period of time.

It is conventionally required after each internal rubber mixing step that the rubber mixture is actually removed from the rubber mixer and cooled to a temperature below 40° C., perhaps to a temperature in a range of about 20° C. to about 40° C. and then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 160° C.) and elevated pressure in a suitable mold. Such practice is well known to those having skill in such art.

It is readily understood by those having skill in the pertinent art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene)amine known as OZONOX RP-2 available from Sovereign Chemical Company and cyclic acetal known as Vulkazone AFS available from Bayer A. G., can be considered part of this invention.

Representative non-aromatic rubber processing oils for use in this invention, namely such oils which contain less than 15 weight percent aromatic compounds, if at all, are, and for example, contain 46 percent to 51 percent paraffinic content and 36 percent to 42 percent naphthenic content.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

While certain representative embodiments and details have been shown for the purpose of illustrating the subject invention, it will be apparent to those skilled in this art that various changes and modifications can be made therein without departing from the scope of the subject invention.

What is claimed is:

1. A tire having a rubber tread composite comprised of an outer tread cap layer and an integral underlying transition zone composite comprised of a combination of a tread base layer and an intermediate layer positioned between said tread cap layer and tread base layer, wherein:

(A) said outer tread cap layer has an outer running surface configured with lugs and grooves and is of a silica-rich rubber composition having a low shear (10 percent strain) G' modulus property (at 30° C. measured at 10 Hz) in a range of about 5 to about 50 MPa, comprised of, based upon parts by weight per 100 parts by weight rubber (phr)
  (1) about 10 to about 90 phr at least one first conjugated diene-based elastomer having a Tg in a range of from about −50° C. to about −110° C. and from about 90 to about 10 phr of at least one additional conjugated diene based elastomer having a Tg in a range of from about −10° C. to about −50° C. wherein the Tg's of said first and additional elastomers are spaced apart by at least 30° C., and
  (2) about 30 to about 150 phr of filler reinforcement selected from at least one of precipitated silica, carbon black and carbon black which contains silica domains on it surface, wherein said precipitated silica and said silica domains contain hydroxyl groups on their surfaces, wherein said filler reinforcement is comprised of at least 51, weight percent of said silica and/or carbon black which contains silica domains on its surface, as the case may be;

(B) said intermediate layer of said transition zone composite extends to and includes a visible bottom portion of at least two of said grooves in said cap layer, wherein said grooves extend completely through the said cap layer, to thereby support an associated tread lug therebetween, wherein said intermediate layer is a carbon black-rich rubber composition having a low shear (10 percent strain) G' modulus property (at 30° C. measured at 10 Hertz) in a range of about 3 to about 25 MPa, and wherein said low shear modulus property of said intermediate layer is at least ten percent lower that said low shear modulus property of said outer tread cap layer, comprised of, based upon parts by weight per 100 parts by weight rubber (phr)
  (1) about 30 to about 100 phr of at least one first conjugated diene-based elastomer having a Tg of lower than −50° C., preferably in a range of about −50° C. to about −110° C., and, correspondingly, about 70 to zero phr of at least one additional conjugated diene-based elastomer having a Tg in a range of about −10 to about −50° C., wherein the Tg's of said first and additional elastomers are spaced apart by 30° C., and
  (2) about 30 to about 120 phr of filler reinforcement is carbon black to the exclusion of synthetic silica and carbon black which contains silica domains on its surface; and (C) said base layer of said transition zone composite is a carbon black-rich rubber composition having a low shear (10 percent strain) G' modulus (at 30° C. measured at 10 Hertz) in a range of about 0.5 to about 10 MPa, and wherein said low shear modulus property of said base layer is at least ten percent lower that said low shear modulus property of said intermediate layer, comprised of, based upon parts by weight per 100 parts by weight rubber (phr);
  (1) about 70 to 100 phr of at least one first conjugated diene-based elastomer having a Tg in a range of about −50° C. to about −110° C., and about 30 to about zero phr of at least one additional conjugated diene-based elastomer having a Tg in a range of about −10 to about −50° C., wherein the Tg's of said first and second elastomers are spaced apart by at least 30° C.; and
  (2) about 30 to about 100 phr of filler reinforcement selected from at least one of carbon black, precipitated silica and carbon black having domains of silica on its surface comprised of at least 51 percent by weight of said carbon black, wherein said precipitated silica and silica domains on said carbon black contain hydroxyl groups (e.g. silanol groups) on their surfaces.

2. The tire of claim 1 wherein the ratio of maximum thickness of said tread cap layer to maximum thickness of said tread composite is in a range of from 2/1 to about 1/5.

3. The tire of claim 1 wherein the ratio of maximum thickness of said transition zone composite to maximum thickness of said tread composite is in a range of from about 1/2 to about 1/4.

4. The tire of claim 1 wherein the ratio of maximum thickness of said intermediate layer to maximum thickness of said base layer is in a range of from about 1/1 to about 5/1.

5. The tire of claim 1 wherein said precipitated silica and said carbon black which contains domains of silica on its surface is used in combination with a bis(3-triethoxysilylpropyl)polysulfide having an average of from 2 to 2.6 or an average of from 3.5 to 4, connecting sulfur atoms in its polysulfidic bridge.

6. The tire of claim 5 wherein elastomers for said first diene-based elastomer(s) of said tread cap layer, intermediate layer and base layer are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers and tin coupled organic solution polymerization prepared styrene/butadiene copolymers cis 1,4-polyisoprene and cis 1,4-polybutadiene; and wherein said additional diene-based elastomer(s) are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers, tin coupled organic solution polymerization prepared styrene/butadiene copolymers, 3,4-polyisoprene and high vinyl polybutadiene.

7. The tire of claim 1 wherein said precipitated silica and said carbon black which contains domains of silica on its surface is used in combination with a bis(3-triethoxysilylpropyl)polysulfide having an average of from 2 to 2.6 exclusive of bis(3-trialkoxysilylalkyl)polysulfide having an average of greater than 2.6 connecting sulfur atoms in its polysulfidic bridge.

8. The tire of claim 7 wherein elastomers for said first diene-based elastomer(s) of said tread cap layer, intermediate layer and base layer are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers and tin coupled organic solution polymerization prepared styrene/butadiene copolymers cis 1,4-polyisoprene and cis 1,4-polybutadiene; and wherein said additional diene-based elastomer(s) are selected from at least one of styrene/butadiene copolymers prepared by organic solvent solution polymerization, styrene/butadiene copolymers prepared by aqueous emulsion polymerization, isoprene/ butadiene copolymers, styrene/isoprene/butadiene terpolymers, tin coupled organic solution polymerization prepared styrene/butadiene copolymers, 3,4-polyisoprene and high vinyl polybutadiene.

9. The tire of claim 1 wherein for said intermediate layer and said base layer of the tread construction, the reinforcing filler is carbon black to the exclusion of synthetic silica and carbon black which contains silica domains on its surface.

10. The tire of claim 9 wherein elastomers for said first diene-based elastomer(s) of said tread cap layer, intermediate layer and base layer are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers and tin coupled organic solution polymerization prepared styrene/butadiene copolymers cis 1,4-polyisoprene and cis 1,4-polybutadiene; and wherein said additional diene-based elastomer(s) are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers, tin coupled organic solution polymerization prepared styrene/butadiene copolymers, 3,4-polyisoprene and high vinyl polybutadiene.

11. The tire of claim 1 wherein elastomer(s) for said first diene-based elastomer(s) of said tread cap layer, intermediate layer and base layer are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers and tin coupled organic solution polymerization prepared styrene/butadiene copolymers, cis 1,4-polyisoprene and cis 1,4-polybutadiene.

12. The tire of claim 1 wherein elastomer(s) for said additional diene-based elastomer(s) for said tread cap layer, intermediate layer and base layer are selected from at least one of styrene/butadiene copolymers prepared by organic solvent solution polymerization, styrene/butadiene copolymers prepared by aqueous emulsion polymerization, isoprene/butadiene copolymers, styrene/isoprene/butadiene terpolymers, tin coupled organic solution polymerization prepared styrene/butadiene copolymers, 3,4-polyisoprene and high vinyl polybutadiene.

* * * * *